United States Patent
Alten (10) Patent No.: US 8,452,529 B2
(45) Date of Patent: May 28, 2013

(54) ADAPTIVE NAVIGATION SYSTEM FOR ESTIMATING TRAVEL TIMES

(75) Inventor: Brett Gregory Alten, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 955 days.

(21) Appl. No.: 11/972,559

(22) Filed: Jan. 10, 2008

(65) Prior Publication Data

US 2009/0182492 A1    Jul. 16, 2009

(51) Int. Cl.
*G01C 21/00*    (2006.01)

(52) U.S. Cl.
USPC ........... 701/400; 701/117; 701/118; 701/119; 701/410; 701/411; 701/467; 701/527; 701/533

(58) Field of Classification Search
USPC ............... 701/117, 118, 119, 200, 201, 202, 701/206, 209, 210, 400, 410, 411, 467, 527, 701/533
See application file for complete search history.

(56) References Cited

U.S. PATENT DOCUMENTS

| | | |
|---|---|---|
| 4,644,351 A | 2/1987 | Zabarsky et al. |
| 4,903,212 A | 2/1990 | Yokouchi et al. |
| 5,031,104 A | 7/1991 | Ikeda et al. |
| 5,067,081 A | 11/1991 | Person |
| 5,182,555 A | 1/1993 | Sumner |
| 5,187,810 A | 2/1993 | Yoneyama et al. |
| 5,195,031 A | 3/1993 | Ordish |
| 5,243,652 A | 9/1993 | Teare |
| 5,295,064 A | 3/1994 | Malec et al. |
| 5,337,044 A | 8/1994 | Folger et al. |
| 5,371,678 A | 12/1994 | Nomura |
| 5,379,057 A | 1/1995 | Clough et al. |
| 5,406,490 A | 4/1995 | Braegas |
| 5,416,890 A | 5/1995 | Beretta |
| 5,469,362 A | 11/1995 | Hunt et al. |
| 5,519,760 A | 5/1996 | Borkowski et al. |
| 5,523,950 A | 6/1996 | Peterson |
| 5,537,460 A | 7/1996 | Holliday, Jr. et al. |
| 5,539,395 A | 7/1996 | Buss |

(Continued)

FOREIGN PATENT DOCUMENTS

| | | |
|---|---|---|
| BR | 9904979 | 12/2000 |
| CA | 2163215 | 5/1994 |

(Continued)

OTHER PUBLICATIONS

Yogesh C. Rathod, Third Party Submission in U.S. Appl. No. 12/233,358 mailed Mar. 30, 2010, 12 pages.

(Continued)

*Primary Examiner* — Khoi Tran
*Assistant Examiner* — Jorge Peche
(74) *Attorney, Agent, or Firm* — Fish & Richardson P.C.

(57) ABSTRACT

An estimated travel time for a route generated by a navigation system can be modified using a route-specific, custom travel factor computed from data collected by the navigation system while the user is traveling the route. In one aspect, the data can be stored in a local or remote database accessible by the navigation system. The data can be used to classify routes so that custom travel factors computed for a route in a given class can be used to estimate travel times for other routes in the same class. In another aspect, the classified custom travel factors can be shared with other users.

20 Claims, 7 Drawing Sheets

U.S. PATENT DOCUMENTS

| | | |
|---|---|---|
| 5,539,647 A | 7/1996 | Shibata et al. |
| 5,552,989 A | 9/1996 | Bertrand |
| 5,559,520 A | 9/1996 | Barzeger et al. |
| 5,570,412 A | 10/1996 | LeBlanc |
| 5,598,572 A | 1/1997 | Tanikoshi et al. |
| 5,628,050 A | 5/1997 | McGraw |
| 5,636,245 A | 6/1997 | Ernst |
| 5,642,303 A | 6/1997 | Small |
| 5,675,362 A | 10/1997 | Clough et al. |
| 5,684,859 A | 11/1997 | Chanroo et al. |
| 5,689,252 A | 11/1997 | Ayanoglu et al. |
| 5,689,431 A | 11/1997 | Rudow et al. |
| 5,717,392 A | 2/1998 | Eldridge |
| 5,732,074 A | 3/1998 | Spaur et al. |
| 5,742,666 A | 4/1998 | Alpert |
| 5,745,865 A | 4/1998 | Rostoker et al. |
| 5,758,049 A | 5/1998 | Johnson et al. |
| 5,760,773 A | 6/1998 | Berman et al. |
| 5,767,795 A | 6/1998 | Schaphorst |
| 5,793,630 A | 8/1998 | Theimer et al. |
| 5,835,061 A | 11/1998 | Stewart |
| 5,845,227 A | 12/1998 | Peterson |
| 5,867,110 A | 2/1999 | Naito et al. |
| 5,870,686 A | 2/1999 | Monson |
| 5,872,526 A | 2/1999 | Tognazzini |
| 5,883,580 A | 3/1999 | Briancon et al. |
| 5,893,898 A | 4/1999 | Tanimoto |
| 5,898,680 A | 4/1999 | Johnstone |
| 5,905,451 A | 5/1999 | Sakashita |
| 5,908,465 A | 6/1999 | Ito et al. |
| 5,910,799 A | 6/1999 | Carpenter |
| 5,933,100 A | 8/1999 | Golding |
| 5,938,721 A | 8/1999 | Dussell et al. |
| 5,946,618 A | 8/1999 | Agre et al. |
| 5,948,041 A | 9/1999 | Abo et al. |
| 5,948,061 A | 9/1999 | Merriman et al. |
| 5,959,577 A | 9/1999 | Fan |
| 5,969,678 A | 10/1999 | Stewart |
| 5,987,381 A | 11/1999 | Oshizawa |
| 6,014,090 A | 1/2000 | Rosen et al. |
| 6,026,375 A | 2/2000 | Hall et al. |
| 6,064,335 A | 5/2000 | Eschenbach |
| 6,069,570 A | 5/2000 | Herring |
| 6,073,013 A | 6/2000 | Agre et al. |
| 6,073,062 A | 6/2000 | Hoshino et al. |
| 6,085,148 A | 7/2000 | Jamison |
| 6,091,956 A | 7/2000 | Hollenberg |
| 6,091,957 A | 7/2000 | Larkins |
| 6,101,443 A | 8/2000 | Kato |
| 6,111,541 A | 8/2000 | Karmel |
| 6,115,754 A | 9/2000 | Landgren |
| 6,119,014 A | 9/2000 | Alperovich et al. |
| 6,122,520 A | 9/2000 | Want et al. |
| 6,134,548 A | 10/2000 | Gottsman et al. |
| 6,138,142 A | 10/2000 | Linsk |
| 6,151,309 A | 11/2000 | Busuioc et al. |
| 6,166,627 A | 12/2000 | Reeley |
| 6,185,427 B1 | 2/2001 | Krasner et al. |
| 6,195,609 B1 | 2/2001 | Pilley et al. |
| 6,199,014 B1 | 3/2001 | Walker |
| 6,199,045 B1 | 3/2001 | Giniger et al. |
| 6,199,099 B1 | 3/2001 | Gershman et al. |
| 6,202,008 B1 | 3/2001 | Beckert et al. |
| 6,202,023 B1 | 3/2001 | Hancock et al. |
| 6,216,086 B1 | 4/2001 | Seymour et al. |
| 6,236,365 B1 | 5/2001 | LeBlanc et al. |
| 6,236,933 B1 | 5/2001 | Lang |
| 6,246,948 B1 | 6/2001 | Thakker |
| 6,252,544 B1 | 6/2001 | Hoffberg |
| 6,256,498 B1 | 7/2001 | Ludwig |
| 6,259,405 B1 | 7/2001 | Stewart et al. |
| 6,266,614 B1 | 7/2001 | Alumbaugh |
| 6,266,615 B1 | 7/2001 | Jin |
| 6,278,884 B1 | 8/2001 | Kim |
| 6,298,306 B1 | 10/2001 | Suarez et al. |
| 6,314,369 B1 | 11/2001 | Ito et al. |
| 6,314,406 B1 | 11/2001 | O'Hagan et al. |
| 6,321,158 B1 | 11/2001 | DeLorme et al. |
| 6,323,846 B1 | 11/2001 | Westerman et al. |
| 6,324,692 B1 | 11/2001 | Fiske |
| 6,326,918 B1 | 12/2001 | Stewart |
| 6,343,317 B1 | 1/2002 | Glorikian |
| 6,345,288 B1 | 2/2002 | Reed et al. |
| 6,353,398 B1 | 3/2002 | Amin et al. |
| 6,353,743 B1 | 3/2002 | Karmel |
| 6,353,837 B1 | 3/2002 | Blumenau |
| 6,356,761 B1 | 3/2002 | Huttunen |
| 6,370,629 B1 | 4/2002 | Hastings et al. |
| 6,377,886 B1 | 4/2002 | Gotou |
| 6,381,603 B1 | 4/2002 | Chan et al. |
| 6,401,027 B1 * | 6/2002 | Xu et al. ................ 701/117 |
| 6,401,032 B1 | 6/2002 | Jamison |
| 6,405,123 B1 | 6/2002 | Rennard et al. |
| 6,414,635 B1 | 7/2002 | Stewart et al. |
| 6,415,227 B1 | 7/2002 | Lin |
| 6,434,530 B1 | 8/2002 | Sloane et al. |
| 6,452,498 B2 | 9/2002 | Stewart |
| 6,456,234 B1 | 9/2002 | Johnson |
| 6,477,581 B1 | 11/2002 | Carpenter |
| 6,490,519 B1 | 12/2002 | Lapidot et al. |
| 6,501,421 B1 | 12/2002 | Dutta et al. |
| 6,505,046 B1 | 1/2003 | Baker |
| 6,505,123 B1 | 1/2003 | Root et al. |
| 6,564,143 B1 | 5/2003 | Alewine et al. |
| 6,570,557 B1 | 5/2003 | Westerman et al. |
| 6,571,279 B1 | 5/2003 | Herz et al. |
| 6,574,484 B1 | 6/2003 | Carley |
| 6,587,835 B1 | 7/2003 | Treyz et al. |
| 6,611,687 B1 | 8/2003 | Clark et al. |
| 6,615,131 B1 | 9/2003 | Rennard et al. |
| 6,615,213 B1 | 9/2003 | Johnson |
| 6,647,257 B2 | 11/2003 | Owensby |
| 6,677,894 B2 | 1/2004 | Sheynblat et al. |
| 6,679,932 B2 | 1/2004 | Birler et al. |
| 6,681,120 B1 | 1/2004 | Kim |
| 6,697,018 B2 | 2/2004 | Stewart |
| 6,711,474 B1 | 3/2004 | Treyz et al. |
| 6,718,344 B2 | 4/2004 | Hirono |
| 6,731,236 B1 | 5/2004 | Hager et al. |
| 6,731,238 B2 | 5/2004 | Johnson |
| 6,741,188 B1 | 5/2004 | Miller et al. |
| 6,748,318 B1 | 6/2004 | Jones |
| 6,759,960 B2 | 7/2004 | Stewart |
| 6,762,772 B1 | 7/2004 | Imamura et al. |
| 6,795,686 B2 | 9/2004 | Master et al. |
| 6,810,323 B1 | 10/2004 | Bullock et al. |
| 6,816,782 B1 | 11/2004 | Walters et al. |
| 6,845,318 B1 | 1/2005 | Moore et al. |
| 6,847,891 B2 | 1/2005 | Pietras et al. |
| 6,847,969 B1 | 1/2005 | Mathai et al. |
| 6,853,911 B1 | 2/2005 | Sakarya |
| 6,853,917 B2 | 2/2005 | Miwa |
| 6,868,074 B1 | 3/2005 | Hanson |
| 6,888,536 B2 | 5/2005 | Westerman et al. |
| 6,912,398 B1 | 6/2005 | Domnitz |
| 6,944,447 B2 | 9/2005 | Portman et al. |
| 6,948,656 B2 | 9/2005 | Williams |
| 6,952,181 B2 | 10/2005 | Karr et al. |
| 6,954,735 B1 | 10/2005 | Djupsjobacka et al. |
| 6,975,959 B2 | 12/2005 | Dietrich et al. |
| 6,980,909 B2 | 12/2005 | Root et al. |
| 7,009,556 B2 | 3/2006 | Stewart |
| 7,044,372 B2 | 5/2006 | Okuda et al. |
| 7,058,594 B2 | 6/2006 | Stewart |
| 7,082,365 B2 | 7/2006 | Sheha et al. |
| 7,096,030 B2 | 8/2006 | Huomo |
| 7,103,470 B2 | 9/2006 | Mintz |
| 7,117,015 B2 | 10/2006 | Scheinert et al. |
| 7,123,189 B2 | 10/2006 | Lalik et al. |
| 7,165,725 B2 | 1/2007 | Casey |
| 7,187,997 B2 | 3/2007 | Johnson |
| 7,256,711 B2 | 8/2007 | Sheha et al. |
| 7,257,392 B2 | 8/2007 | Tang et al. |
| 7,298,327 B2 | 11/2007 | Dupray et al. |
| 7,310,516 B1 | 12/2007 | Vacanti |
| 7,339,496 B2 | 3/2008 | Endo et al. |
| 7,343,564 B2 | 3/2008 | Othmer |

| Patent/Publication | Date | Name |
|---|---|---|
| 7,349,706 B2 | 3/2008 | Kim et al. |
| 7,359,713 B1 | 4/2008 | Tiwari |
| 7,370,283 B2 | 5/2008 | Othmer |
| 7,386,396 B2 | 6/2008 | Johnson |
| 7,427,021 B2 | 9/2008 | Kemper et al. |
| 7,500,607 B2 | 3/2009 | Williams |
| 7,525,484 B2 | 4/2009 | Dupray et al. |
| 7,848,388 B2 * | 12/2010 | Tudosoiu ............... 375/147 |
| 2001/0018349 A1 | 8/2001 | Kinnunen et al. |
| 2002/0035493 A1 | 3/2002 | Mozayeny et al. |
| 2002/0035609 A1 | 3/2002 | Lessard et al. |
| 2002/0042266 A1 | 4/2002 | Heyward et al. |
| 2002/0046069 A1 | 4/2002 | Mozayeny et al. |
| 2002/0046077 A1 | 4/2002 | Mozayeny et al. |
| 2002/0046084 A1 | 4/2002 | Steele et al. |
| 2002/0091991 A1 | 7/2002 | Castro |
| 2002/0140560 A1 | 10/2002 | Altman et al. |
| 2002/0160815 A1 | 10/2002 | Patel et al. |
| 2002/0167442 A1 | 11/2002 | Taylor |
| 2003/0069683 A1 | 4/2003 | Lapidot et al. |
| 2003/0100326 A1 | 5/2003 | Grube et al. |
| 2003/0101225 A1 | 5/2003 | Han et al. |
| 2003/0134657 A1 | 7/2003 | Norta et al. |
| 2003/0144793 A1 | 7/2003 | Melaku et al. |
| 2003/0236106 A1 | 12/2003 | Master et al. |
| 2004/0036649 A1 | 2/2004 | Taylor |
| 2004/0054428 A1 | 3/2004 | Sheha et al. |
| 2004/0128067 A1 | 7/2004 | Smith |
| 2004/0151151 A1 | 8/2004 | Kubler et al. |
| 2004/0158401 A1 | 8/2004 | Yoon |
| 2004/0158584 A1 | 8/2004 | Necsoiu et al. |
| 2004/0172409 A1 | 9/2004 | James |
| 2004/0176907 A1 | 9/2004 | Nesbitt |
| 2004/0198379 A1 | 10/2004 | Magee et al. |
| 2004/0203836 A1 | 10/2004 | Gorday et al. |
| 2004/0203909 A1 | 10/2004 | Koster |
| 2004/0228330 A1 | 11/2004 | Kubler et al. |
| 2004/0236504 A1 | 11/2004 | Bickford et al. |
| 2004/0242149 A1 | 12/2004 | Luneau |
| 2004/0246940 A1 | 12/2004 | Kubler et al. |
| 2004/0248586 A1 | 12/2004 | Patel et al. |
| 2004/0260939 A1 | 12/2004 | Ichikawa et al. |
| 2004/0264442 A1 | 12/2004 | Kubler et al. |
| 2005/0002419 A1 | 1/2005 | Doviak et al. |
| 2005/0004838 A1 | 1/2005 | Perkowski et al. |
| 2005/0027442 A1 | 2/2005 | Kelley et al. |
| 2005/0085272 A1 | 4/2005 | Anderson et al. |
| 2005/0096840 A1 | 5/2005 | Simske |
| 2005/0114021 A1 | 5/2005 | Krull et al. |
| 2005/0149250 A1 | 7/2005 | Isaac |
| 2005/0153681 A1 | 7/2005 | Hanson |
| 2005/0197767 A1 | 9/2005 | Nortrup |
| 2005/0221808 A1 | 10/2005 | Karlsson et al. |
| 2005/0221843 A1 | 10/2005 | Friedman et al. |
| 2005/0222756 A1 | 10/2005 | Davis et al. |
| 2005/0227709 A1 | 10/2005 | Chang et al. |
| 2005/0228860 A1 | 10/2005 | Hamynen et al. |
| 2005/0239477 A1 | 10/2005 | Kim et al. |
| 2005/0250440 A1 * | 11/2005 | Zhou et al. ............... 455/12.1 |
| 2005/0286421 A1 | 12/2005 | Janacek |
| 2006/0015249 A1 | 1/2006 | Gieseke |
| 2006/0022048 A1 | 2/2006 | Johnson |
| 2006/0025158 A1 | 2/2006 | Leblanc et al. |
| 2006/0041377 A1 | 2/2006 | Jung et al. |
| 2006/0041378 A1 | 2/2006 | Cheng et al. |
| 2006/0058955 A1 | 3/2006 | Mehren |
| 2006/0085392 A1 | 4/2006 | Wang et al. |
| 2006/0094353 A1 | 5/2006 | Nielsen et al. |
| 2006/0111122 A1 | 5/2006 | Carlson et al. |
| 2006/0180649 A1 | 8/2006 | Casey |
| 2006/0184978 A1 | 8/2006 | Casey |
| 2006/0195481 A1 | 8/2006 | Arrouye et al. |
| 2006/0202819 A1 | 9/2006 | Adamczyk et al. |
| 2006/0211453 A1 | 9/2006 | Schick |
| 2006/0218209 A1 | 9/2006 | Arrouye et al. |
| 2006/0227047 A1 * | 10/2006 | Rosenberg ............... 342/357.13 |
| 2006/0229802 A1 | 10/2006 | Vertelney et al. |
| 2006/0284767 A1 | 12/2006 | Taylor |
| 2006/0287824 A1 | 12/2006 | Lin |
| 2007/0001875 A1 | 1/2007 | Taylor |
| 2007/0005188 A1 | 1/2007 | Johnson |
| 2007/0005233 A1 | 1/2007 | Pinkus et al. |
| 2007/0010942 A1 | 1/2007 | Bill |
| 2007/0016362 A1 | 1/2007 | Nelson |
| 2007/0042790 A1 | 2/2007 | Mohi et al. |
| 2007/0055684 A1 | 3/2007 | Steven |
| 2007/0061245 A1 | 3/2007 | Ramer et al. |
| 2007/0061363 A1 | 3/2007 | Ramer et al. |
| 2007/0073480 A1 | 3/2007 | Singh |
| 2007/0073719 A1 | 3/2007 | Ramer et al. |
| 2007/0093258 A1 | 4/2007 | Steenstra et al. |
| 2007/0106465 A1 * | 5/2007 | Adam et al. ............... 701/209 |
| 2007/0115868 A1 | 5/2007 | Chen et al. |
| 2007/0124043 A1 | 5/2007 | Ayoub et al. |
| 2007/0124066 A1 | 5/2007 | Kikuchi |
| 2007/0127439 A1 | 6/2007 | Yokoyama |
| 2007/0129888 A1 | 6/2007 | Rosenberg |
| 2007/0130153 A1 | 6/2007 | Nachman et al. |
| 2007/0135136 A1 | 6/2007 | Ische |
| 2007/0135990 A1 | 6/2007 | Seymour et al. |
| 2007/0149212 A1 | 6/2007 | Gupta et al. |
| 2007/0150320 A1 | 6/2007 | Huang |
| 2007/0153983 A1 | 7/2007 | Bloebaum et al. |
| 2007/0153984 A1 | 7/2007 | Bloebaum et al. |
| 2007/0153986 A1 | 7/2007 | Bloebaum et al. |
| 2007/0155404 A1 * | 7/2007 | Yamane et al. ............ 455/456.1 |
| 2007/0156326 A1 | 7/2007 | Nesbitt |
| 2007/0179854 A1 | 8/2007 | Ziv et al. |
| 2007/0204218 A1 | 8/2007 | Weber et al. |
| 2007/0206730 A1 | 9/2007 | Polk |
| 2007/0219706 A1 | 9/2007 | Sheynblat |
| 2007/0232326 A1 | 10/2007 | Johnson |
| 2007/0233387 A1 | 10/2007 | Johnson |
| 2007/0254676 A1 | 11/2007 | Pedigo et al. |
| 2007/0260751 A1 | 11/2007 | Meesseman |
| 2007/0271328 A1 | 11/2007 | Geelen et al. |
| 2007/0276586 A1 | 11/2007 | Jeon et al. |
| 2007/0276587 A1 | 11/2007 | Johnson |
| 2007/0276596 A1 | 11/2007 | Solomon et al. |
| 2007/0282521 A1 | 12/2007 | Broughton |
| 2007/0299601 A1 * | 12/2007 | Zhao et al. ............... 701/201 |
| 2008/0004791 A1 * | 1/2008 | Sera ............... 701/117 |
| 2008/0004802 A1 | 1/2008 | Horvitz |
| 2008/0005104 A1 | 1/2008 | Flake et al. |
| 2008/0005301 A1 | 1/2008 | Li et al. |
| 2008/0015422 A1 | 1/2008 | Wessel |
| 2008/0021632 A1 | 1/2008 | Amano |
| 2008/0024360 A1 | 1/2008 | Taylor |
| 2008/0024364 A1 | 1/2008 | Taylor |
| 2008/0027636 A1 | 1/2008 | Tengler et al. |
| 2008/0030308 A1 | 2/2008 | Johnson |
| 2008/0032703 A1 | 2/2008 | Krumm et al. |
| 2008/0045234 A1 | 2/2008 | Reed |
| 2008/0052407 A1 | 2/2008 | Baudino et al. |
| 2008/0070593 A1 | 3/2008 | Altman et al. |
| 2008/0071466 A1 | 3/2008 | Downs et al. |
| 2008/0082254 A1 | 4/2008 | Huhtala et al. |
| 2008/0085727 A1 | 4/2008 | Kratz |
| 2008/0086240 A1 | 4/2008 | Breed |
| 2008/0091347 A1 | 4/2008 | Tashiro |
| 2008/0097698 A1 | 4/2008 | Arnold-Huyser et al. |
| 2008/0098090 A1 | 4/2008 | Geraci et al. |
| 2008/0104634 A1 | 5/2008 | Gajdos et al. |
| 2008/0109153 A1 | 5/2008 | Gueziec |
| 2008/0113672 A1 | 5/2008 | Karr et al. |
| 2008/0129528 A1 | 6/2008 | Guthrie |
| 2008/0132243 A1 | 6/2008 | Spalink et al. |
| 2008/0132251 A1 | 6/2008 | Altman et al. |
| 2008/0132252 A1 | 6/2008 | Altman et al. |
| 2008/0140308 A1 | 6/2008 | Yamane et al. |
| 2008/0140520 A1 | 6/2008 | Hyder et al. |
| 2008/0153512 A1 | 6/2008 | Kale et al. |
| 2008/0153513 A1 | 6/2008 | Flake et al. |
| 2008/0155453 A1 | 6/2008 | Othmer |
| 2008/0161034 A1 | 7/2008 | Akiyama |
| 2008/0167083 A1 | 7/2008 | Wyld et al. |
| 2008/0167811 A1 | 7/2008 | Geelen |
| 2008/0172173 A1 | 7/2008 | Chang et al. |

| | | | | | | |
|---|---|---|---|---|---|---|
| 2008/0172374 | A1 | 7/2008 | Wolosin et al. | JP | 2005-241519 | 9/2005 |
| 2008/0176545 | A1 | 7/2008 | Dicke et al. | JP | 2006-112338 | 4/2006 |
| 2008/0177793 | A1 | 7/2008 | Epstein et al. | JP | 2006-184007 | 7/2006 |
| 2008/0189033 | A1 | 8/2008 | Geelen et al. | JP | 2006-270889 | 10/2006 |
| 2008/0249667 | A1 | 10/2008 | Horvitz et al. | JP | 2006-279838 | 10/2006 |
| 2008/0271072 | A1 | 10/2008 | Rothschild et al. | JP | 2007-033220 | 2/2007 |
| 2008/0288166 | A1* | 11/2008 | Onishi et al. ............... 701/209 | JP | 2007-033331 | 2/2007 |
| 2008/0318550 | A1 | 12/2008 | DeAtley | JP | 2007-033368 | 2/2007 |
| 2009/0003659 | A1 | 1/2009 | Forstall et al. | JP | 2007-127439 | 5/2007 |
| 2009/0005005 | A1 | 1/2009 | Forstall et al. | JP | 2007-147439 | 6/2007 |
| 2009/0005018 | A1 | 1/2009 | Forstall et al. | JP | 2007-201699 | 8/2007 |
| 2009/0005021 | A1 | 1/2009 | Forstall et al. | JP | 2007-221433 | 8/2007 |
| 2009/0005068 | A1 | 1/2009 | Forstall et al. | JP | 2007-240400 | 9/2007 |
| 2009/0005070 | A1 | 1/2009 | Forstall et al. | JP | 2007-259291 | 10/2007 |
| 2009/0005071 | A1 | 1/2009 | Forstall et al. | JP | 2007-271299 | 10/2007 |
| 2009/0005072 | A1 | 1/2009 | Forstall et al. | JP | 2007-304009 | 11/2007 |
| 2009/0005076 | A1 | 1/2009 | Forstall et al. | JP | 2008-058917 | 3/2008 |
| 2009/0005080 | A1 | 1/2009 | Forstall et al. | JP | 2008-129774 | 6/2008 |
| 2009/0005082 | A1 | 1/2009 | Forstall et al. | KR | 2004-102440 | 12/2004 |
| 2009/0005964 | A1 | 1/2009 | Forstall et al. | KR | 2005-096746 | 10/2005 |
| 2009/0005965 | A1 | 1/2009 | Forstall et al. | TW | 200426387 | 12/2004 |
| 2009/0005975 | A1 | 1/2009 | Forstall et al. | WO | WO 93/20546 | 10/1993 |
| 2009/0005978 | A1 | 1/2009 | Forstall et al. | WO | WO 97/07467 | 2/1997 |
| 2009/0005981 | A1 | 1/2009 | Forstall et al. | WO | WO 97/24577 | 7/1997 |
| 2009/0006336 | A1 | 1/2009 | Forstall et al. | WO | WO 98/03951 | 1/1998 |
| 2009/0030605 | A1 | 1/2009 | Breed | WO | WO 98/07112 | 2/1998 |
| 2009/0031006 | A1 | 1/2009 | Johnson | WO | WO 98/54682 | 12/1998 |
| 2009/0033540 | A1 | 2/2009 | Breed et al. | WO | WO 99/16036 | 4/1999 |
| 2009/0089706 | A1 | 4/2009 | Furches et al. | WO | WO 99/44183 | 9/1999 |
| 2009/0098857 | A1 | 4/2009 | De Atley | WO | WO 01/37597 | 5/2001 |
| 2009/0177385 | A1 | 7/2009 | Matas et al. | WO | WO 02/054813 | 7/2002 |
| 2009/0259573 | A1 | 10/2009 | Cheng et al. | WO | WO 03/023593 | 3/2003 |
| 2009/0271271 | A1 | 10/2009 | Johnson | WO | WO 2004/008792 | 3/2003 |
| 2009/0281724 | A1 | 11/2009 | Blumenberg et al. | WO | WO 03/096055 | 11/2003 |
| 2009/0286549 | A1 | 11/2009 | Canon et al. | WO | WO 2004/021730 | 3/2004 |
| | | | | WO | WO 2004/061576 | 7/2004 |
| | FOREIGN PATENT DOCUMENTS | | | WO | WO 2004/076977 | 9/2004 |
| | | | | WO | WO 2005/006258 | 1/2005 |
| CA | 2287596 | | 4/2000 | WO | WO 2006/065856 | 6/2006 |
| CA | 2432239 | | 12/2004 | WO | WO 2006/113125 | 10/2006 |
| DE | 4437360 | | 4/1996 | WO | WO 2007/052285 | 5/2007 |
| DE | 19506890 | | 8/1996 | WO | WO 2008/051929 | 5/2008 |
| DE | 19914257 | | 3/1999 | WO | WO 2008/085740 | 7/2008 |
| DE | 10 141 695 | | 3/2003 | WO | WO 2009/140031 | 11/2009 |
| EP | 785535 | | 7/1997 | | | |
| EP | 0 809 117 | | 11/1997 | | OTHER PUBLICATIONS | |
| EP | 0 699 330 | | 4/1998 | | | |
| EP | 0 908 835 | | 4/1999 | | | |
| EP | 0 997 808 | | 5/2000 | | | |
| EP | 1 300 652 | | 4/2003 | | | |
| EP | 1 457 928 | | 9/2004 | | | |
| EP | 1 469 287 | | 10/2004 | | | |
| EP | 1 496 338 | | 1/2005 | | | |
| EP | 1 770 956 | | 9/2005 | | | |
| EP | 1 465 041 | | 2/2006 | | | |
| EP | 1 659 817 | | 5/2006 | | | |
| EP | 1 790 947 | | 5/2007 | | | |
| EP | 1 860 904 | | 11/2007 | | | |
| FR | 2730083 | | 8/1996 | | | |
| FR | 2272911 | | 6/1999 | | | |
| FR | 2810183 | | 12/2001 | | | |
| GB | 2 359 888 | | 5/2001 | | | |
| GB | 2 407 230 | | 4/2005 | | | |
| JP | 62142215 | | 6/1987 | | | |
| JP | 05-071974 | | 3/1993 | | | |
| JP | 06-525189 | | 5/1994 | | | |
| JP | 2007-221433 | | 5/1994 | | | |
| JP | 9-062993 | | 7/1997 | | | |
| JP | 9-210710 | | 8/1997 | | | |
| JP | 11-234736 | | 8/1999 | | | |
| JP | 2000-163379 | | 6/2000 | | | |
| JP | 2001-160063 | | 6/2001 | | | |
| JP | 2002-310680 | | 10/2002 | | | |
| JP | 10-030933 | | 2/2003 | | | |
| JP | 2003-228532 | | 8/2003 | | | |
| JP | 2004-045054 | | 2/2004 | | | |
| JP | 2004-219146 | | 7/2004 | | | |
| JP | 2004-362271 | | 12/2004 | | | |
| JP | 2005-106741 | | 4/2005 | | | |
| JP | 2005-182146 | | 7/2005 | | | |

Weiss et al., "Zone services—An approach for location-based data collection", Proceedings of the 8th International Conference on E-commerce Technology and the 3rd IEEE International Conference on Enterprise Computing, E-Commerce and E-Services, 2006; 8 pages.

Feddema et al., "Cooperative Sentry Vehicles and Differential GPS Leapfrog," 2000, United States Department of Energy, pp. 1-12.

Maxwell et al., "Alfred: The Robot Waiter Who Remembers You," AAAI Technical Report WS-99-15, 1999, 12 pages.

Shibata et al., "Development and Integration of Generic Components for a Teachable Vision-Based Mobile Robot," IEEE/ASME Transactions on Mechatronics, 1996, 1(3):230-236.

Wu et al., "A Multimedia System for Route Sharing and Video-Based Navigation," IEEE, 2006, pp. 73-76.

U.S. Appl. No. 11/464,671, filed Aug. 15, 2006, Johnson.

U.S. Appl. No. 11/827,065, filed Jul. 10, 2007, Johnson.

U.S. Appl. No. 12/044,363, filed Mar. 7, 2008, Johnson.

Drane et al., "The accurate location of mobile telephones", Third Annual World Congress on Intelligent Transport Systems, Orlando, Florida, Oct. 1996.

"Travel Time Data Collection Handbook—Chapter 5: Its Probe Vehicle Techniques", FHWA-PL-98-035 Report, Department of Transport, University of Texas, Mar. 1998; [online] [Retrieved from the Internet at http://www.fhwa.dot.gov/ohim/handbook/chap5.pdf.

Ygnace et al., "Travel Time Estimation on the San Francisco Bay Area Network Using Cellular Phones as Probes", Working Paper, Institute of Transportation Studies, University of California, Berkeley, 2000.

Wang et al., "A Unified Vehicle Supervising and Traffic Information System", IEEE, 1996, pp. 968-972.

"27 Countries in your pocket"; [online] [Retrieved on Sep. 29, 2005] Retrieved from the Internet <URL: http://www.mio-tech.be/en/printview/press-releases-2005-09-29.htm; 1 page.

"Animated Transition"; [online] [Retrieved on Oct. 16, 2006] Retrieved from the Internet <URL: http://designinterfaces.com/Animated_Transition; 2 pages.

"DaimlerCrysler Guide5 Usecases Overview Map", 1 page (no reference date).

"dialDTMF" [online] [Retrieved Jan. 10, 2008] Retrieved from the Internet, URL: http://dialdtmf.sourceforge.net/, 9 pages.

"FAQ"; [online] [Retrieved Nov. 30, 2007] Retrieved from the Internet, URL: http://www.navizon.com/FAQ.htm; 8 pages.

"How it Works"; Navizon—Peer-to-Peer Wireless Positioning; [online] [Retrieved on Nov. 30, 2007]; Retrieved from the Internet, URL: http://www.navizon.com/FullFeatures.htm, 7 pages.

"International Roaming Guide—Personal Experience(s) from Customer and Community Member"; [online] [Retrieved Jun. 26, 2006] Retrieved from the Internet <URL: http://forums.cingular.com/cng/board/message?board.id=1185; 6 pages.

"iPhone Software/Hardware Hack: LocoGPS—GPS Add-on for the iPhone"; [online] [Retrieved on Dec. 25, 2007] Retrieved from the Internet <URL: http://www.iphonehacks.com/iphone_applications/index.html; 41 pages.

"Mio 269=Users Manula"; 2005; 44 pages.

"MOREnet Dialing Plan: PSTN and IP Network Integration for H.323, H320 VoIP and Public Voice Networks", [online] [Retrieved on Jan. 11, 2008] Retrieved from the Internet < URL: http://www.more.net/technical/research/dialplan/index.html, 12 pages.

"New program for mobile blogging for PocketPC released: My Blog"; [online] [Retrieved on Apr. 5, 2006]; Retrieved from the Internet, URL: http://msmobiles.com/news.php/4067.html.

"Numbering and Dialing Plan within the United States", Alliance for Telecommunications Industry Solutions; 2005; 17 pages.

"nüvifone Images"; [online] [Retrieved on Feb. 4, 2008]; Retrieved from the Internet, URL: http://www8.garmin.com/buzz/nuvifone/mediagallery.jsp; 2 pages.

Review Guide—Google Maps for mobile (beta); Google; 2006; 7 pages.

"User-centered design of mobile solutions", NAMAHN, 2006, 18 pages.

"User's Manual MioMap 2.0"; Aug. 2005; 60 pages.

"Windows Live Search for Mobile Goes Final, Still Great"; [online] [Retrieved on Mar. 11, 2007]; Retrieved from the Internet, URL: http://gizmodo.com/gadgets/software/windows-live-search-for-mobile-goes-final-still-great-236002.php; 3 pages.

"Windows Mobile 6 Professional Video Tour"; [online] [Retrieved on Mar. 11, 2007]; Retrieved from the Internet, URL: http://gizmodo.com/gadgets/cellphones/windows-mobile-6-professional-video-tour-237039.php; 4 pages.

"Windows Mobile"; Microsoft; 2007, 2 pages.

Anand et al., "Quantitative Analysis of Power Consumption for Location-Aware Applications on Smart Phones", IEEE International Symposium on Industrial Electronics, 2007.

Balliet, "Transportation Information Distribution System", IBM Technical Disclosure Bulletin, [online] [Retrieved Nov. 7, 2008] Retrieved from the Internet, URL: https://www.delphion.com/tdbs/tdb?order=86A+61395; Jun. 1986; 2 pages.

Beard et al., "Estimating Positions and Paths of Moving Objects", IEEE 2000, pp. 1-8.

Bederson, B.B., Audio Augmented Reality: A Prototype Automated Tour Guide [online] [retrieved on Aug. 30, 2002] [retrieved from http://www.cs.umd.edu/~bederson/papers/chi-95-aar/] pp. 1-4.

Berman et al., "The Role of Dead Reckoning and Inertial Sensors in Future General Aviation Navigation", IEEE, 1998, pp. 510-517.

Bevly et al., "Cascaded Kalman Filters for Accurate Estimation of Multiple Biases, Dead-Reckoning Navigation, and Full State Feedback Control of Ground Vehicles", IEEE Transactions on Control Systems in Technology, vol. 15, No. 2, Mar. 2007, pp. 199-208.

Binzhuo et al., "Mobile Phone GIS Based on Mobile SVG", IEEE 2005.

Bokharouss et al., "A Location-Aware Mobile Call Handling Assistant", International Conference on Advanced Information Networking and Applications Workshops, 2007.

Boonsrimuang et al., "Mobile Internet Navigation System", IEEE, 2002, pp. 325-328.

Camp et al., "A computer-based method for predicting transit time systems", Decsision Sciences, vol. 5, pp. 339-346, 1974.

Carew; "Phones that tell you where to drive, meet, eat"; [online] [Retrieved May 26, 2007]; Retrieved from the Internet <URL htttp://news.yahoo.com/s/nm/20070525/wr_nm/column_pluggedin_dc_2&printer=1;_ylt=Ahqaftn7x m1S2r0FZFeu9G4ht.cA; 2 pages.

Charny, "AT&T puts 411 to the text"; [online] [Retrieved Mar. 4, 2009]; Retrieved from the Internet <URL http://news.cnet.com/ATT-puts-411-to-the-text/2100-1039_3-1000669.html; May 8, 2003; 2 pages.

Cho et al., A Traveler Information Service Structure in Hybrid T-DMB and Cellular Communication Network, Broadcast Systems Research Group, IEEE, 2006, pp. 747-750.

Christie et al., "Development and Deployment of GPS wireless devices for E911 and Location based services", IEEE 2002.

Chua et al., "Intelligent Portal for Event-triggered SMS Alerts", 2nd International Conference on Mobile Technology, Applications and Systems, 2005.

Civilis et al., "Efficient Tracking of Moving Objects with Precision Guarantees", IEEE, Proceedings of the First Annual International Conference on Mobile and Ubiquitous Systems: Networking and Services, 2004, 10 pages.

Dalrymple, Jim; "Google Maps adds locator, but not for iPhone", [online] [Retrieved Nov. 30, 2007]; Retrieved from the Internet <URL: http://news.yahoo.com/s/macworld/20071130/tc_macworld/googlemaps20071130_0&printer=1;_ylt=Auvf3s6LQK_pOaJlb954T_DQn6gB; 1 page.

Dibdin, Peter, "Where are mobile location based services?", Dec. 14, 2001, pp. 1-8.

Dunn et al., "Wireless Emergency Call System", IBM TDB, Sep. 1994.

Ebine, "Dual Frequency resonant base station antennas for PDC systems in Japan", IEEE, pp. 564-567, 1999.

Evans, "In-Vehicle Man-Machine Interaction the Socrates Approach", Vehicle Navigation & Information System Conference Proceedings, Aug. 31, 1994-Sep. 2, 1994, pp. 473-477.

FM 3-25.26 Map Reading and Land Navigation Field Manual No. 3-25.26, Headquarters Department of the Army, Washington, DC [online] [retrieved on Apr. 9, 2004] [retrieved from http://155.217.58.58/cgi-bin/atdl.d11/fm/3-25.26/toc.htm] Jul. 20, 2001, pp. 1-7 and J-1 to J-3.

*GPS 12 Personal Navigator Owner's Manual & Reference*, Garmin Corporation, Jan. 1999, pp. 1-60.

Guo et al., "An Intelligent Query System based on Chinese Short Message Service for Restaurant Recommendation", IEEE 2007, 1 page.

Hameed et al., "An Intelligent Agent-Based Medication and Emergency System", IEEE 2006.

Helal et al., "Drishti: An Integrated Navigation System for Visually Impaired and Disabled", Fifth International Symposium on Wearable Computers (ISWC'01), IEEE, 2001, pp. 149-156.

Hohman et al., "GPS Roadside Integrated Precision Positioning System", Position Location and Navigation Symposium (IEEE 2000), pp. 221-230.

International Numbering and SMS—Type of Numbering, TON, Numbering Plan Indicator, NPI, [online] [Retrieved Jan. 5, 2007] Retrieved from the Internet <URL: http://www.activeexperts.com/support/activsms/tonnpi/.

Jain, R., Potential Networking Applications of Global Positioning Systems (GPS) [online] [retrieved on Nov. 18, 2008] [retrieved from http://arxiv.org/ftp/cs/papers/9809/9809079.pdf] OSU Technical Report TR-24, Apr. 1996, pp. 1-40.

Jirawimut et al., "A Method for Dead Reckoning Parameter Correction in Pedestrian Navigation System", IEEE Transactions on Instrumentation and Measurement, vol. 52, No. 1, Feb. 2003, pp. 209-215.

Ju et al., "RFID Data Collection and Integration based on Mobile Agent", IEEE, 2006.

Kbar et al., "Mobile Station Location based on Hybrid of Signal Strength and Time of Arrival", IEEE, 2005.

Koide et al., "3-D Human Navigation System with Consideration of Neighboring Space Information", IEEE International Conference on Systems, Man and Cybernetics, 2006 (SMC '06), vol. 2, (Oct. 8-11, 2006), pp. 1693-1698.

Lloyd et al., "Cellular phone base stations installation violate the Electromagnetic Compatibility regulations", IEEE, 2004.

Manabe et al., "On the M-CubITS Pedestrian Navigation System", IEEE, 2006, pp. 793-798.

Meier et al., "Location-Aware Event-Base Middleware: A Paradigm for Collaborative Mobile Applications?", Sep. 2003.

Miller et al., "Synchronization of Mobile XML Databases by Utilizing Deferred Views", IEEE 2004.

Nardi et al., "Integrating Communication and Information through Contact Map", Communications of the ACM, vol. 45, No. 4, Apr. 2002.

Navizon Peer-to-Peer Wireless Positioning; [online] [Retrieved on Nov. 30, 2007]; Retrieved from the Internet, URL: http//www.navizon.com/; 2 pages.

Northard, "Docking Station Communication Link", IBM TDB, Feb. 1994.

Oh et al., "Spatial Applications Using 4S Technology for Mobile Environment", IEEE 2002.

Paksoy et al., "The Global Position System-Navigation Tool of the Future", Journal of Electrical & Electronics, 2002, vol. 2, No. 1, pp. 467-476.

Parikh, "Tele Locate", IBM Technical Disclosure Bulletin, [online] [Retrieved Nov. 7, 2008] Retrieved from the Internet, URL: https://www.delphion.com/tdbs/tdb?order+92A=62775; Sep. 1992; 1 page.

Partial International Search Report, dated Jul. 29, 2008, issued in corresponding PCT/US2008/050295.

International Search Report and Written Opinion, dated Jun. 9, 2008, issued in International Application No. PCT/US2007/088880, filed Dec. 27, 2007.

Pfoser et al., "Dynamic Travel Time Maps—Enabling Efficient Navigation", Proceedings of the 18th International Conference on Scientific and Statistical Database Management (SSDBM'06), IEEE, 10 pages.

Portfolio 2007; [online] [Retrieved on Jun. 14, 2007]; Retrieved from the Internet, URL: http://eric.wahlforss.com/folio; 3 pages.

RD 409052, Research Disclosure Alerting Abstract, "Location dependent information for satellite based vehicle communication—required application of Global Position System (GPS) to automatically extract relevant portions of data package as vehicle changes position," May 10, 1998, 1 page.

Rekimoto, J., *Augment-able Reality: Situated Communication through Physical and Digital Spaces*, iswc, pp. 68, Second International Symposium on Wearable computers (ISWC'98), 1998, pp. 1-8.

Rogers et al., "Adaptive User Interfaces for Automotive Environments", IEEE Intelligent Vehicles Symposium 2000, Oct. 3-5, 2000, pp. 662-667.

Rozier, J., *Hear & There: An Augmented Reality System of Linked Audio*, Proceedings of the International Conference on Auditory Display, Atlanta, GA, Apr. 2000, pp. 1-6.

Samadani et al., "PathMaker: Systems for Capturing Trips", IEEE (2004) International Conference on Multimedia and Expo., Publication Date: Jun. 27-30, 2004, vol. 3, pp. 2123-2126, 2004.

Schreiner, "Where We At? Mobile Phones Bring GPS to the Masses", IEEE Computers Society, May/Jun. 2007, pp. 6-11.

Spohrer. "New Paradigms for Using Computers", 1997; retrieved from the Internet, URL: <http://almaden.ibm.com/npuc97/1997/spohrer.htm>.

Sung et al., "Towards Reliable Peer-to-Peer Data Sharing over Mobile Ad hoc Networks", IEEE, 2005.

Weiss et al., "Zone services—An approach for location-based data collection", Proceedings of the 8th International Conference on E-commerce Technology and the 3rd IEEE International Conference on Enterprise Computing, E-Commerce and E-Services (8 pages), 2006.

Yang et al., "A Mutlimedia System for Route Sharing and Video-based Navigation", IEEE, 2006, pp. 73-76.

Yang et al. "Global Snapshots for Distributed Debugging", IEEE, pp. 436-440, 1992.

Yanyan et al., "The model of optimum route selection in vehicle automatic navigation system based on unblocked reliability analyses", IEEE 2003.

"Cyberguide: a mobile context-aware tour guide", Wireless Networks Archive (Special Issue: Mobile computing and networking; selecting papers from MobiCom '96), 3(5):421-433, 1997.

"Frontiers in electronic media", Interactions Archive 4(4):32-64, 1997.

"Location-aware mobile applications based on directory services", International Conference on Mobile Computing and Networking Archive, Proceedings on the 3rd Annual ACM/IEEE International Conference on Mobile Computing and Networking, Budapest, Hungary, pp. 23-33, 1997.

Sharpe et al., U.S. Appl. No. 12/434,586, filed May 1, 2009.
Sharp et al., U.S. Appl. No. 12/434,582, filed May 1, 2009.
Van Os et al., U.S. Appl. No. 12/165,413, filed Jun. 30, 2008.
Blumenberg et al., U.S. Appl. No. 12/119,316, filed May 12, 2008.
Low et al., U.S. Appl. No. 12/233,358, filed Sep. 18, 2008.
Sazegari et al., U.S. Appl. No. 12/122,339, filed May 16, 2008.
Johnson, U.S. Appl. No. 12/044,363, filed Mar. 7, 2008.
Johnson, U.S. Appl. No. 11/827,065, filed Jul. 10, 2007.
Herz, U.S. Appl. No. 12/270,814, filed Nov. 13, 2008.
Budka et al., "A Bayesian method to Improve Mobile Geolocation Accuracy", IEEE, 2002, pp. 1021-1025.
Yamamoto et al., "Position Location Technologies Using Signal Strength in Cellular Systems", IEEE, 2001, pp. 2570-2575.
International Search Report and Written Opinion, dated Oct. 1, 2009, issued in PCT/US2009/041298.

* cited by examiner

ADAPTIVE NAVIGATION SYSTEM FOR ESTIMATING TRAVEL TIMES

TECHNICAL FIELD

This subject matter is generally related to navigation systems.

BACKGROUND

Many conventional navigation systems estimate travel time for routes to assist the user in time management. For example, a simplistic travel time estimate can be derived by dividing the length of the route by the posted speed limit of the route. Such a time estimate often includes error due to a variety of variables that are not accounted for in the computation, such as road conditions, traffic congestion, driving patterns, accuracy of navigation system, etc.

Some navigation systems use traffic time providers to provide more accurate travel times. These providers often use cell phone probes and wireless cell phone networks to estimate travel times for highways and roadways. One system, for example, traces specific, anonymous vehicles, and uses a sequence of cellular messages to correlate the cell phones to the route traveled. Once a cell phone is correlated to a route, the system can measure the position of the cell phone and travel time samples can be generated for various segments of the route. If the travel time samples are averaged over long periods of time then the travel time samples can lead to large errors in travel times estimates. Moreover, publicly available studies have shown that travel time estimation using cell phones as data probes may not be accurate in heavy traffic conditions due to the inability to accurately track position.

Some navigation systems allow users to enter parameters related to the user's specific driving habits. These parameters, however, do not take into account local traffic patterns and changes in the user's driving habits based on time of day, season or other factors that could alter the user's driving habits.

SUMMARY

An estimated travel time for a route generated by a navigation system can be modified using a custom travel factor determined from personal travel data collected by the navigation system while the user is traveling the route. In one aspect, the personal travel data can be stored in a local or remote database accessible by the navigation system. The personal travel data can be used to classify routes so that custom travel factors for a route in a given class can be used to estimate travel times for other routes in the same class. In another aspect, the classified custom travel factors can be shared with other users.

These features provide customized travel time estimates that take into account a user's driving habits, the characteristics of the vehicle being navigated, road conditions, seasonal conditions, traffic congestion and other factors, which cannot be accounted for by conventional statistical calculations based on data samples obtained from a test vehicle or device traveling the route.

DETAILED DESCRIPTION

System Overview

Figure 1:
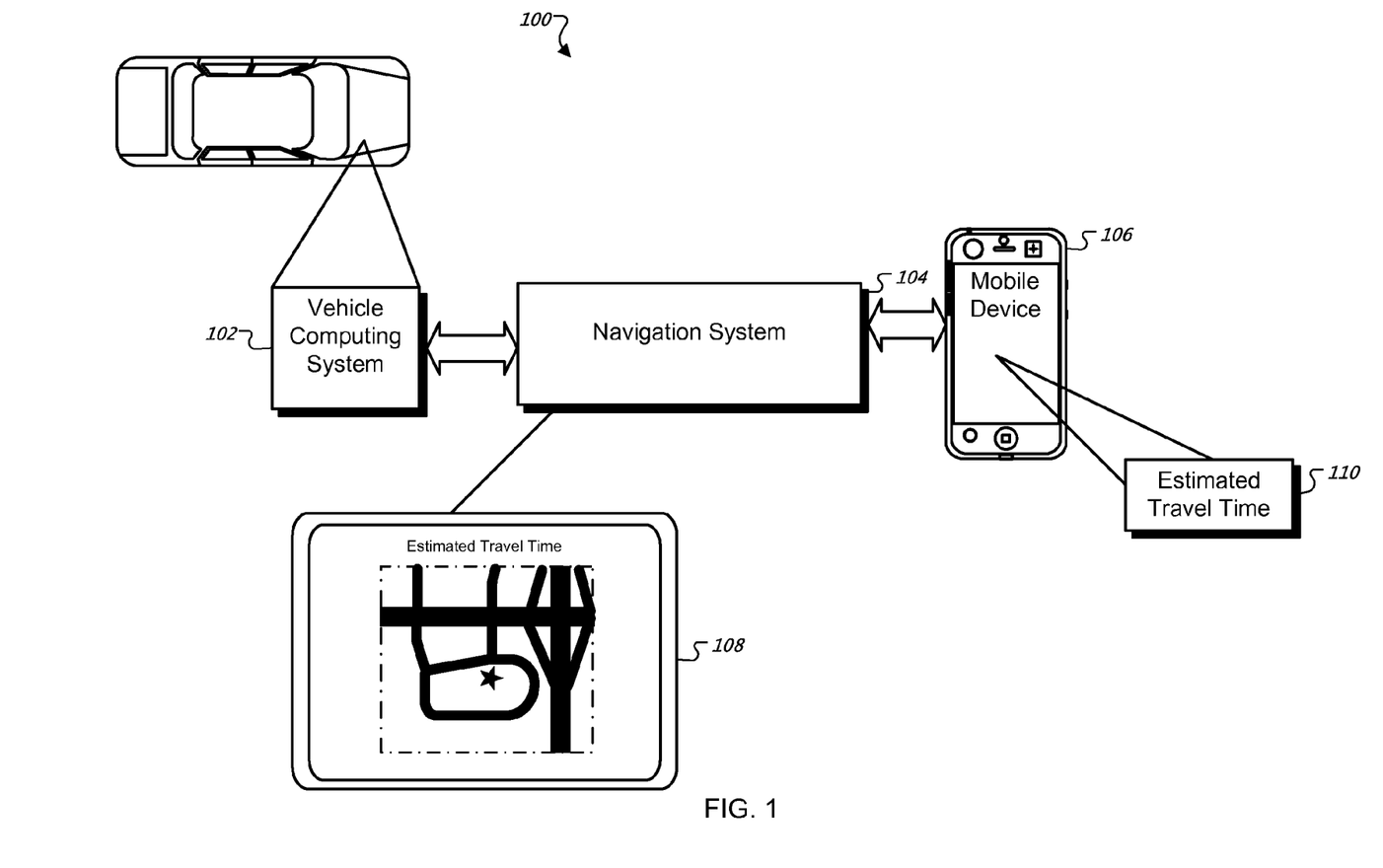
FIG. 1 is a block diagram of an example navigation system for estimating travel time.

FIG. 1 is a block diagram of example navigation system 100 for estimating travel time. System 100 can include one or more of vehicle computing system 102, navigation system 104 and mobile device 106. In some implementations, vehicle computing system 102 can be coupled to navigation system 104 and provides navigation system 104 with information related to the operation of the vehicle (e.g., speed, fuel consumption, braking information). In other implementations, vehicle computing system 102 can include navigation system 104.

In some implementations, navigation system 104 can be coupled to mobile device 106 for receiving estimated travel time 110 and other information from mobile device 106. Mobile device 106 can be any portable device capable of performing navigation functions, including but not limited to: a portable navigation system, a mobile phone, a USB drive, a media player, an email device, etc.

In some implementations, navigation system 104 can be installed in the vehicle or can be a portable device. Mobile device 106 can include navigation system 104 or can be coupled (e.g., physically using a tether or dock or wirelessly) to navigation system 104. Navigation system 104 and/or mobile device 106 can be operable to provide estimated travel time 110 for a route being traveled by navigation system 104 and/or mobile device 106. Navigation system 104 and/or mobile device 106 can include display 108 for displaying navigation data, such as a map highlighting the route to be navigated. Navigation system 104 and/or mobile device 106 can include means (e.g., a keypad, rotary knob, buttons) for receiving input from a user or data from a network, as described in reference to FIG. 5.

Example Travel Time Estimation Process

Figure 2A:
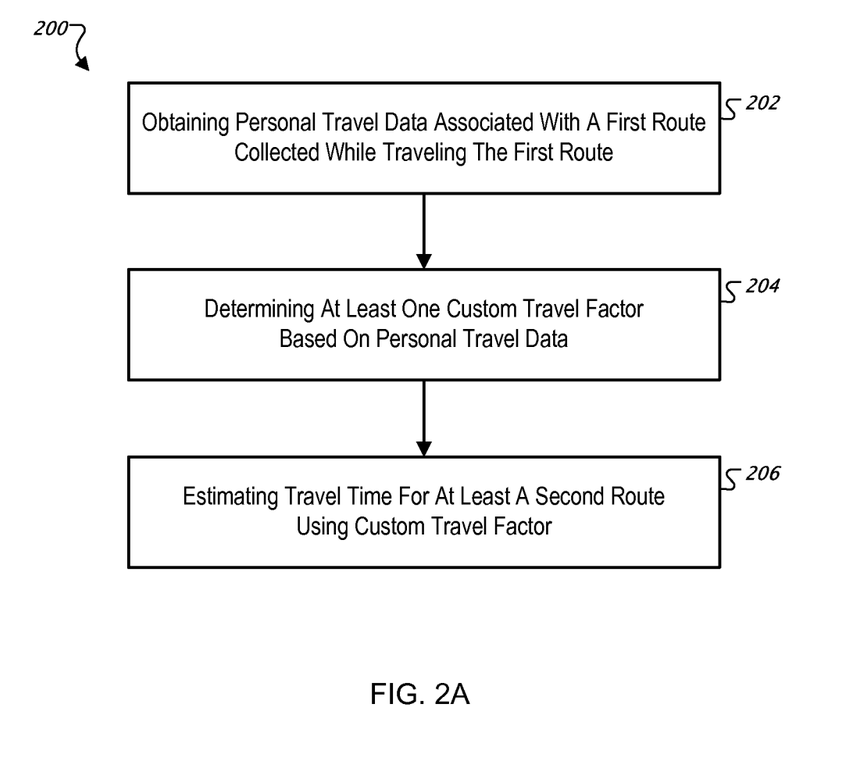
FIGS. 2A-2B are flow diagrams of example processes for estimating travel time.

FIG. 2A is a flow diagram of example process 200 for estimating travel time. In some implementations, process 200 begins by obtaining personal travel data associated with a first route collected while traveling the first route (202). Examples of personal travel data can include but are not limited to: time, location, speed, accelerations, de-accelerations, braking patterns, etc. At least one custom travel factor (e.g., a time adjustment) can be determined based on the personal travel data (204). Using the custom travel factor, travel time can be estimated for at least a second route (206). The second route can be similar to, or the same as, the first route, or a different route in the same class as the first route, as described further in reference to FIG. 7. The custom travel factor can be used to modify a generic travel factor, such as an average speed or average travel time for the route.

Figure 2B:
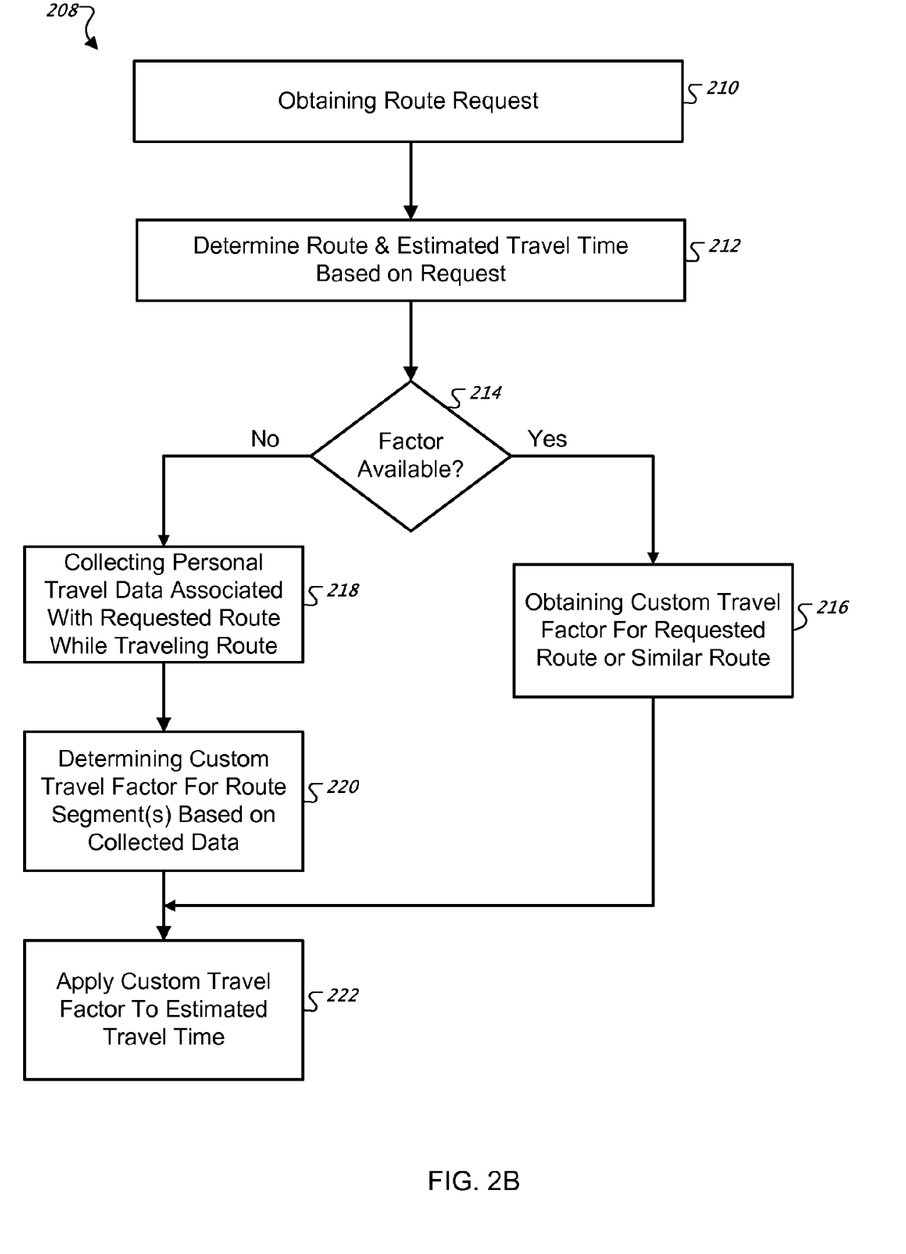

FIG. 2B is a flow diagram of example process 208 for estimating travel time. In some implementations, process 208 can begin by obtaining a route request (210). The route request can be specified by user input. For example, a user can submit a route request by entering a destination address into a navigation system. The navigation system determines a route and estimated travel time based on the request (212). The estimated travel time can be determined using a time estimation algorithm that is native to the navigation system. For example, the native algorithm may assume a constant or average speed (e.g., a posted speed limit) for the route. However, since driving speeds are seldom constant, the time travel estimates will often contain error which can be adjusted by custom travel factors. If a custom travel factor is available (214) because it was determined using personal travel data collected during one or more previous trips along the same route, then the custom travel factor for the route or a similar route can be obtained (216) from a local or remote database, and applied to the estimated travel time (222). A "similar" route can be a route that falls into the same route class as the requested route, as described in reference to FIG. 7.

In some implementations, a route can be divided into route segments and each segment can be associated with one or more custom travel factors. The factors can be represented in any suitable units or dimensions (e.g., speed, time). For example, the factors can be represented in minutes which can be added or subtracted to the estimated travel time obtained in step 210.

If custom travel factors are not available (e.g., a new route is requested), then new customer travel factors can be computed based on personal travel data collected while the user (or the navigation system) travels the route (218). Examples of data include but are not limited to: time, location, speed, accelerations, de-accelerations, braking patterns, etc. The new factors can be determined based on the collected data (220) and applied to the estimated travel time for the route (222). In some implementations, the new factors can be determined based on the collected data in combination with other data provided by other sources or service providers (e.g., traffic information providers, navigation service providers, location based service providers).

To compute a custom travel factor, a route can be broken into one or more route segments and the average speed of the vehicle can be measured at one or more geographical locations in each segment. The speed measurements can be acquired from a vehicle computing system, by an integrated or portable navigation system or by any other device (e.g., a mobile phone) located in the vehicle which has appropriate sensors for detecting speed (e.g., accelerometer). In some implementations, the speed measurements can be computed from positional data of a mobile device (e.g., a cell phone, Wi-Fi) provided by a wireless network carrier using various known technologies (e.g., triangulation using cell towers). If a route is traveled repeatedly by the user, a rolling average of travel speeds for one or more locations of each route segment can be computed. The speed data can be stored locally or remotely where it can be accessed by the user's navigation system (or shared with other navigation systems) to generate custom travel factors using known distances associated with the route segments and/or other data.

In some implementations, rather than collecting speed data the elapsed time to travel a given route segment can be determined using a timer operating in the navigation system, for example. The latter method would take into account local obstacles that could effect travel time (e.g., stoplights, toll booths, bridges, railroad crossings). Each time a user travels a route, the actual time to travel the route can be computed and added to a rolling travel time average which can be stored in a local or remote database. For example, a user may travel the same route to work Monday through Friday. For each trip, the navigation system determines actual travel time which can be added to the rolling travel time average. The custom travel factors can be set equal to the rolling travel time averages.

In some implementations, the average speeds and/or average travel times for a particular route segment can be collected over a period of time to provide a historical view of how the average speeds and/or travel times change for different seasons, days of the week, times of day, etc. And, since this data can be collected by the user's personal navigation system (rather than from a probe), the historical view can be personalized to the user's driving habits, the peculiarities of the vehicle (e.g., a motorcycle, truck, SUV, sports car), the type of navigation system (e.g., GPS, cell phone tower triangulation, Wi-Fi), etc. In some implementations, average speeds and average times can be measured and each measurement can be used to confirm the accuracy of the other, and to select which measurement to use for a custom travel factor. For example, an average speed measurement can be converted into an average time measurement and compared with data provided by a travel time estimation service to confirm its accuracy compared to a directly computed average time measurement. An example travel time estimation service provider is AirSage® of Atlanta, Ga., U.S.A.

Example Estimated Travel Time Calculation

Figure 3:
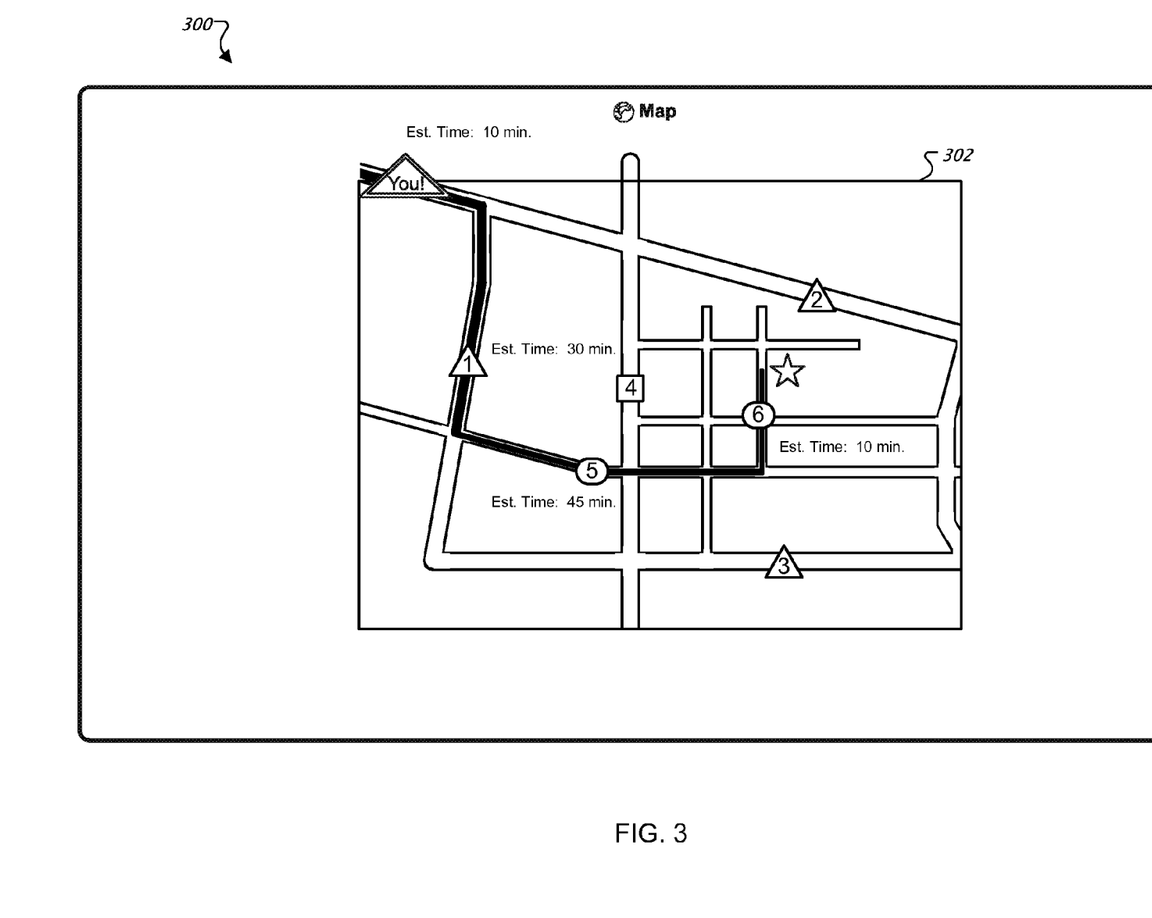
FIG. 3 illustrates an example route which can include route segments.

FIG. 3 illustrates an example route including route segments for computing custom travel factors. In the example shown, a route (shown in bold) is presented on map 302 presented on map display 300 of a navigation system. The route includes route segments 2, 1, 5 and 6. For simplicity of calculations, we can assume that the total distance is 40 miles, where each segment is 10 miles. The posted speed limits for the route segments 2, 1, 5 and 5 are 65 mph, 55 mph, 35 mph and 25 mph, respectively. In this example, the navigation system may compute an estimated total travel time for the route to be [10/65+10/55+10/35+10/25]*60~60 minutes.

Each time the user travels the route an actual average speed measurement can be made for each route segment. Segment 2 is a highway and has an actual average speed of 55 mph. Segment 1 is a highway and has an actual average speed of 40 mph. Segment 5 is a residential street and has an actual average speed of 35 mph. Segment 6 is a residential street and has an actual average speed of 20 mph. Thus the actual average time to travel the route is [10/55+10/40+10/35+10/20] ~72 minutes. When compared with the estimated travel time of about 60 minutes, the estimated travel time error is about +12 minutes. Thus in this example, the custom travel factor for this route can be +12 minutes.

This custom travel factor can capture the driving habits or patterns of the user and other factors effecting time such as road conditions and traffic congestion. The factor can be time stamped or otherwise indexed for easy retrieval from a local and/or remote database. A given factor may only be valid for certain times of the year, certain days of the week and certain times of the day, as described in reference to FIG. 6. The average speed can be calculated from the stored factors and other historical data using an iterative method to find a least-square fit. As new actual travel time data are collected, the average speed can be updated with an exponential smoothing procedure. Some examples of such techniques are described in Camp, R. and D. DeHayes (1974), "A Computer-based Method for Predicting Transit Time Parameters Using Grid Systems," Decision Sciences, Vol. 5, pp. 339-346, which publication is incorporated by reference herein in its entirety.

Example Navigation System Architecture

Figure 4:
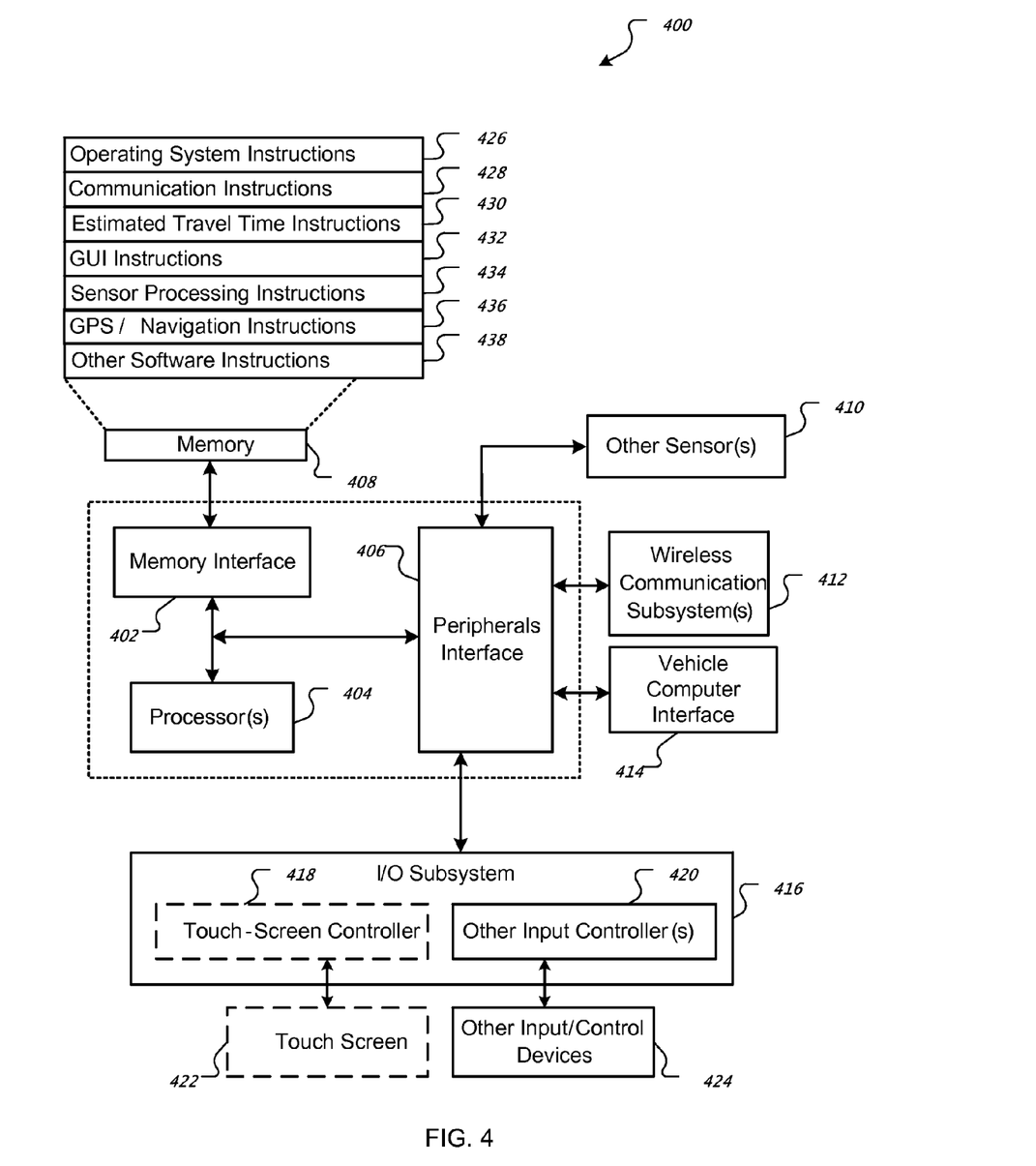
FIG. 4 is a block diagram of an example navigation system.

FIG. 4 is a block diagram of example navigation system 400 for implementing the features and operations described in reference to FIGS. 1-3. In this example, navigation system 400 can include wireless communication capabilities, for example, to communicate with one or more network-based providers, such as a navigation service provider or a traffic information provider.

Navigation system 400 can include memory interface 402, one or more data processors 404 (e.g., image processors and/or central processing units) and peripherals interface 406. Memory interface 402, one or more processors 404 and/or peripherals interface 406 can be separate components or can be integrated in one or more integrated circuits. The various components in navigation system 400 can be coupled by one or more communication buses or signal lines. For example, other sensors 410 can be connected to peripherals interface 406, such as a positioning system (e.g., a GPS receiver), an accelerometer, a temperature sensor, or other sensing device, to facilitate related functionalities. Peripherals interface 406 can be used to interface with vehicle computer interface 414 of a vehicle computing system, e.g., vehicle computing system 102 shown in FIG. 1.

Communication functions can be facilitated through one or more wireless communication subsystems 412, which can include radio frequency receivers and transmitters and/or optical (e.g., infrared) receivers and transmitters. The specific design and implementation of wireless communication subsystem 412 can depend on the communication network(s) over which navigation system 400 is intended to operate. For example, navigation system 400 can include a communication subsystem designed to operate over a GSM network, a GPRS network, an EDGE network, a Wi-Fi or WiMax network, and a Bluetooth™ network.

In this example, I/O subsystem 416 can include optional touch screen controller 418 and/or other input controller(s) 420. Touch-screen controller 418 can be coupled to optional touch screen 422. Touch screen 422 and touch screen controller 418 can, for example, detect contact and movement (e.g., gestures) or break thereof using any of multiple touch sensitivity technologies, including but not limited to capacitive, resistive, infrared, and surface acoustic wave technologies, as well as other proximity sensor arrays or other elements for determining one or more points of contact with touch screen 422.

Other input controller(s) 420 can be coupled to other input/control devices 424, such as one or more buttons, rocker switches, thumb-wheel, infrared port, USB port, and/or a pointer device such as a stylus. The one or more buttons (not shown) can include an up/down button for volume control of a speaker and/or a microphone. Touch screen 422 can, for example, also be used to implement virtual or soft buttons and/or a keyboard. Other input/output and control devices can also be used.

Memory interface 402 can be coupled to memory 408. Memory 408 can include high-speed random access memory and/or non-volatile memory, such as one or more magnetic disk storage devices, one or more optical storage devices, and/or flash memory (e.g., NAND, NOR). Memory 408 can store operating system 426, such as Darwin, RTXC, LINUX, UNIX, OS X, WINDOWS, or an embedded operating system such as VxWorks. Operating system 426 may include instructions for handling basic system services and for performing hardware dependent tasks. In some implementations, operating system 426 can be a kernel (e.g., UNIX kernel).

Memory 408 may also store communication instructions 428 to facilitate communicating with one or more additional devices, one or more computers and/or one or more servers. Memory 408 can include estimated travel time instructions 430 to implement features and operations described in reference to FIGS. 1-3. Memory 408 can include GPS/Navigation instructions 436 to facilitate GPS and navigation-related processes and instructions. Memory 408 can include graphical user interface instructions 432 to facilitate graphic user interface processing and sensor processing instructions 434 to facilitate sensor-related processing and functions (if any). For example, if navigation system 400 includes an accelerometer, instructions 434 can receive output from the accelerometers and can use the output to generate speed data.

Each of the above identified instructions and applications can correspond to a set of instructions for performing one or more functions described above. These instructions need not be implemented as separate software programs, procedures or modules. Memory 408 can include additional instructions or fewer instructions. Furthermore, various functions of navigation system 400 can be implemented in hardware and/or in software, including in one or more signal processing and/or application specific integrated circuits. Memory 408 can include other software instructions 438 for one or more applications.

Example Network for Estimating Travel Time

Figure 5:
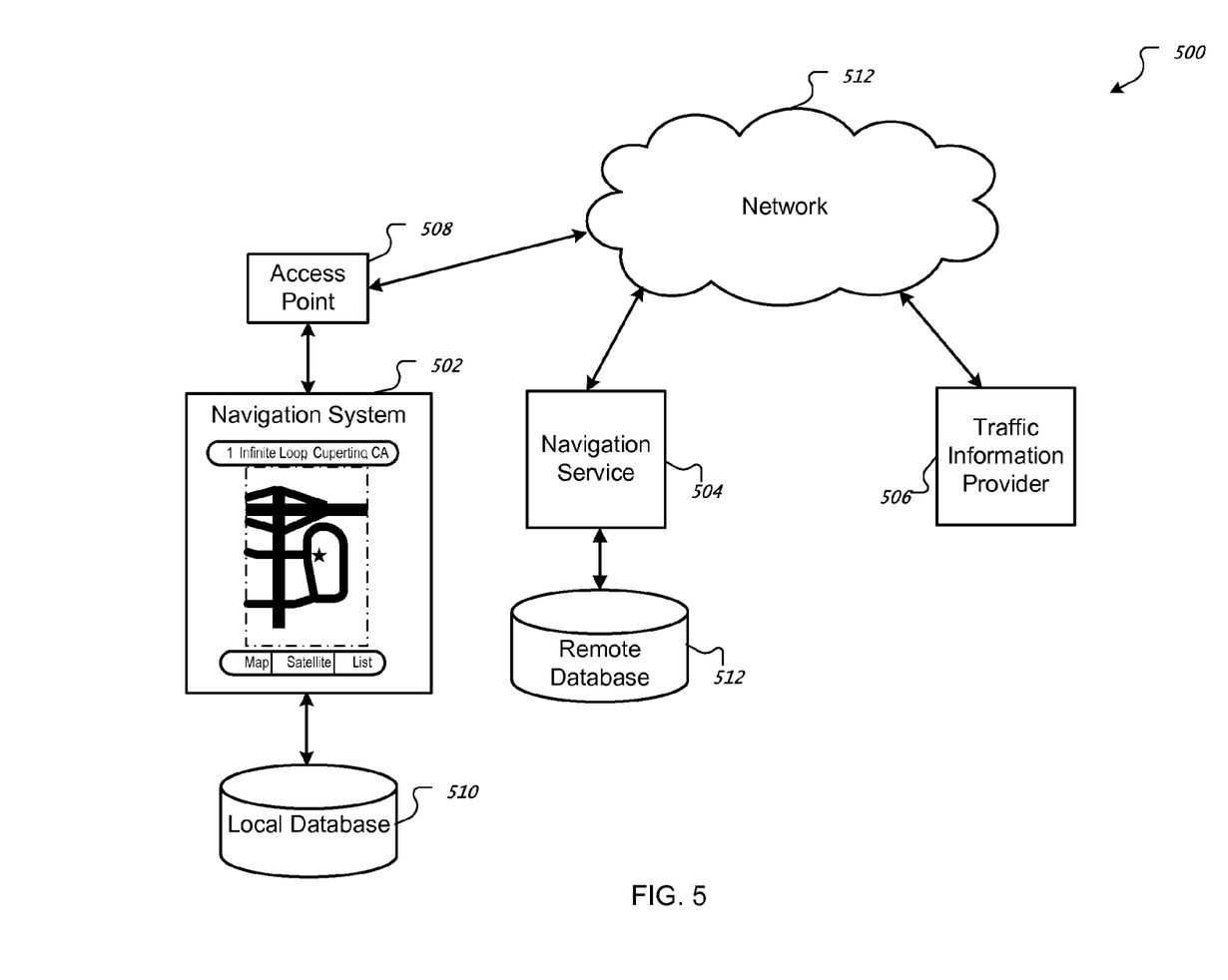
FIG. 5 illustrates an example network for estimating travel time.

FIG. 5 illustrates example network 500 for estimating travel time. In some implementations, the navigation system can communicate over one or more wired and/or wireless networks 512 (e.g., the Internet, WLAN). For example, access point 508, such as an 802.11g wireless access point, can provide communication access to network 512. In some implementations, the navigation system can be physically connected to access point 508 using one or more cables and access point 508 can be a vehicle computer system.

The navigation system can communicate with one or more services over one or more wired and/or wireless networks 512. For example, navigation service 504 can provide navigation information, e.g., map information, location information, route information, and other information, to the navigation system. Such information can be stored in remote database 512. In other implementations, the navigation system obtains map, location and route information from local database 510. In other implementations, the navigation system uses a combination of local database 510 and remote database 512 to store data for use in estimating travel times. Traffic information service 506 can provide traffic information (including travel time estimates) to the navigation system which can be used to improve or confirm the accuracy of time travel estimates computed by the navigation system, as described in reference to FIG. 3.

Example Schema for Retrieving Time Adjustment Data

Figure 6:
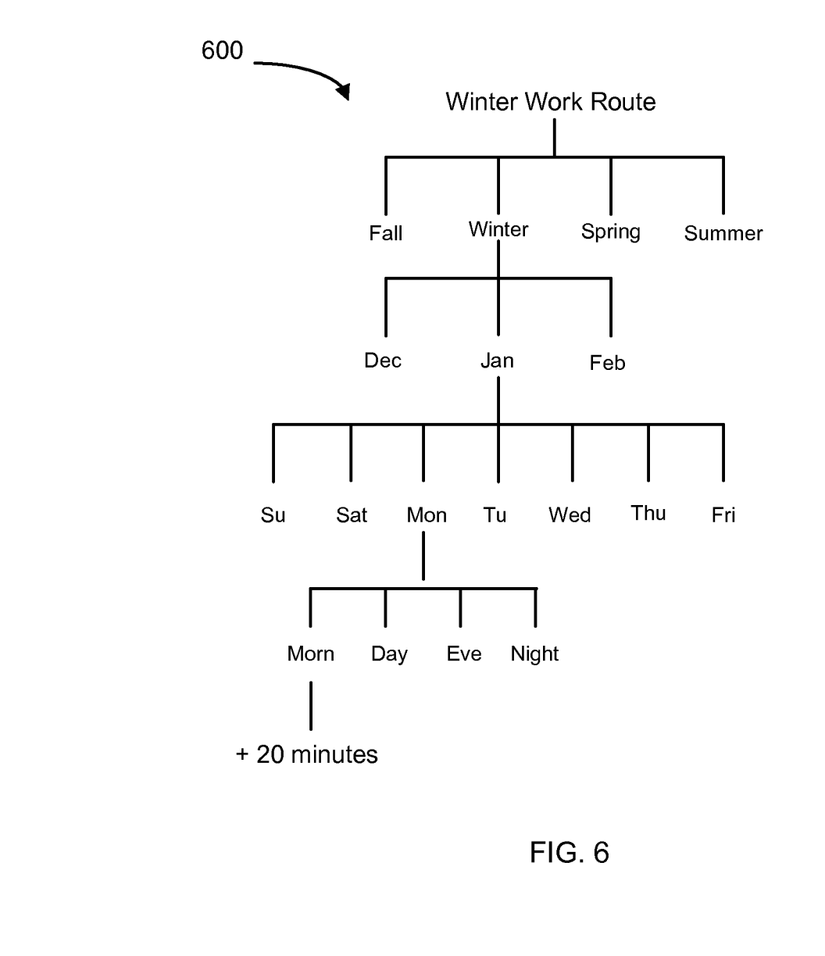
FIG. 6 illustrates an example data structure for retrieving time adjustments from a database for use in estimating travel time.

FIG. 6 illustrates an example schema 600 for retrieving a custom travel factor from a data structure for use in estimating travel time. In the example shown, the navigation system retrieves from a local or remote database a custom travel factor of 20 minutes for the user's "Winter Work Route." This particular custom travel factor is associated with Winter, the month of January, Monday and Morning. If the user requests the Winter Work Route from their navigation system, then the navigation system can use the current season, month, day and time to generate a query for retrieving the custom travel factor of +20 minutes. The factor can be added to the estimated travel time provided by the native travel time algorithm of the navigation system to generate a more accurate estimated travel time for the Winter Work Route.

Example Data Structure for Classifying Routes

Figure 7:
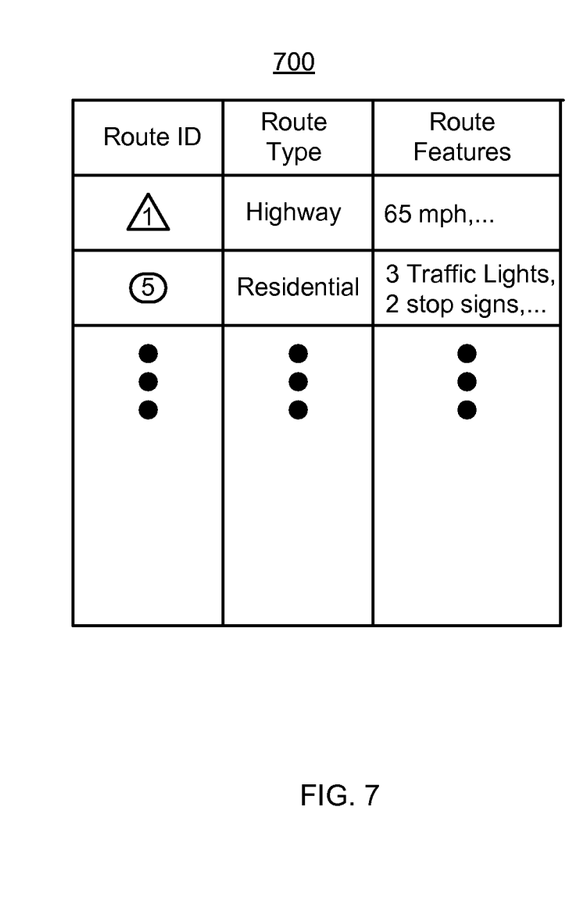
FIG. 7 illustrates an example data structure for classifying routes.

FIG. 7 illustrates example data structure 700 for classifying routes. In some implementations, it may be possible to classify routes based on route features which can include custom travel factors. While a user travels a route, in some implementations the route can be transmitted to a navigation service through a network connection (e.g., navigation service 504). The service accesses various route data resources to extract a feature set for the route. Features can include but are not limited to: the number of segments, the average speeds for the segments, posted speed limits for the segments, route type (e.g., local, arterial, collector, rural, city, residential), the number of streetlights and their associated timings, the number of stop signs, the number of school zones or other speed-restricted zones, etc. A classifier (e.g., a support vector machine) can be applied to the features to generate labels or categories for the routes. Each new route can be processed by the classifier and labeled appropriately. In some implementations, each route can be given a similarity score that can be used to determine routes that are similar (based on similarity criteria) to the requested route.

In some implementations, the average speeds for a route can provide a route signature that can be compared against other route signatures. For example, an n-dimensional vector having average speeds as vector components can be compared with other n-dimensional vectors in an n-dimensional vector space to identify similar routes. The similarity criteria can be Euclidean distance, least-square error, or any other suitable criteria.

In some implementations, data structure 700 can be a table containing a row for each route associated with a user. The columns can include data collected to facilitate classification by a classifier. In the example shown, the columns include: Route Name, Route Type and Route Features. Other data an also be stored as desired. The Route Type and Route Features can be used by the classifier to find routes of the same type and having similar features to the requested route. Thus if a user requests a new route, a time adjustment factor for a route in the same class can be used to improve the estimated travel time calculated by the navigation system. In some implementations, factors can be shared with other users through a service bureau, social network, forum, online community, etc.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of estimating travel time, comprising:
obtaining an actual time taken by a vehicle for traveling a first route during a trip, wherein the actual time for traveling the first route during the trip is determined by a navigation system coupled to the vehicle during the trip;
updating a rolling average of travel time taken by the vehicle for traveling the first route based on the actual time taken during the trip;
determining at least one custom travel factor based on the rolling average of travel time taken by the vehicle for traveling the first route, the custom travel factor indicating a time adjustment for estimating travel times and is based on at least one of driving habits of a user associated with the vehicle, road conditions and traffic congestion; and
estimating a travel time for at least a second route using the custom travel factor.

2. The method of claim 1, wherein the first and second routes are classified as routes of a similar type, and wherein a route is classified into one of several types based on a feature set associated with the route.

3. The method of claim 2, wherein classifying a route into one of several types comprises applying a support vector machine classifier to the feature set, the method further comprising associating a similarity score to the route.

4. The method of claim 2, wherein the first and second routes are the same.

5. The method of claim 1, wherein the custom travel factor is used to modify a generic travel factor including at least one of an average speed and an average travel time for the second route.

6. The method of claim 1, wherein the custom travel factor is further based on one or more of time, location, driving patterns, season, route type, route features, traffic information, road conditions and location data.

7. The method of claim 1, wherein determining a custom travel factor, further comprises:
computing an average custom travel factor based on two or more custom travel factors.

8. The method of claim 1, wherein at least one of the determining and estimating is performed by a network resource.

9. The method of claim 1, wherein the first and second routes are classified as routes of a similar type by comparing route signatures provided by the first and second routes, the route signatures based on average speeds associated with the first and second routes.

10. The method of claim 9, wherein a route signature includes an n-dimensional vector having average speeds as vector components, and wherein comparing route signatures comprises comparing n-dimensional vectors corresponding to different routes to identify similar routes.

11. The method of claim 10, wherein identifying similar routes comprises using a similarity criterion that is based on one of Euclidean distance and least square error.

12. A navigation system, comprising:
a processor; and
a computer-readable medium coupled to the processor and having instructions stored thereon, which, when executed by the processor, causes the processor to perform operations comprising:
obtaining an actual time taken by a vehicle for traveling a first route during a trip, wherein the actual time for traveling the first route during the trip is determined by a navigation system coupled to the vehicle during the trip;
updating a rolling average of travel time taken by the vehicle for traveling the first route based on the actual time taken during the trip;
determining at least one custom travel factor based on the rolling average of travel time taken by the vehicle for traveling the first route, the custom travel factor indicating a time adjustment for estimating travel times and is based on at least one of driving habits of a user associated with the vehicle, road conditions and traffic congestion; and estimating a travel time for at least a second route using the custom travel factor.

13. The system of claim 12, wherein the first and second routes are classified as routes of a similar type, and wherein a route is classified into one of several types based on a feature set associated with the route.

14. The system of claim 13, wherein the first and second routes are the same.

15. The system of claim 12, wherein the custom travel factor is used to modify a generic travel factor including at least one of an average speed and an average travel time for the second route.

16. The system of claim 12, wherein the custom travel factor is further based on one or more of time, location, driving patterns, season, route type, route features, traffic information, road conditions and location data.

17. The system of claim 12, where determining at least one custom travel factor further comprises:
   determining if a custom travel factor is available; and
   if a custom travel factor is available,
      obtaining the custom travel factor.

18. The system of claim 17, where determining at least one custom travel factor further comprises:
   identifying a class for the first or second route;
   identifying a similar route in the class; and
   obtaining a custom travel factor associated with the similar route.

19. The system of claim 12, wherein the actual time is obtained by a mobile phone.

20. The system of claim 19, wherein the actual time is obtained from one or more sensors of the mobile phone.

* * * * *

UNITED STATES PATENT AND TRADEMARK OFFICE
CERTIFICATE OF CORRECTION

PATENT NO. : 8,452,529 B2  
APPLICATION NO. : 11/972559  
DATED : May 28, 2013  
INVENTOR(S) : Brett Gregory Alten Page 1 of 1

It is certified that error appears in the above-identified patent and that said Letters Patent is hereby corrected as shown below:

Title Page 5, column 1, line 7, under "OTHER PUBLICATIONS", delete ""DaimlerCrysler" and insert -- "DaimlerChrysler --, therefor.

Title Page 5, column 1, line 24, under "OTHER PUBLICATIONS", delete "Manula"" and insert -- Manual" --, therefor.

Title Page 5, column 2, line 4, under "OTHER PUBLICATIONS", delete "Decsision" and insert -- Decision --, therefor.

Title Page 6, column 1, line 28, under "OTHER PUBLICATIONS", delete "order+92A=62775;" and insert -- order=92A+62775; --, therefor.

Title Page 6, column 2, line 19, under "OTHER PUBLICATIONS", delete "Mutlimedia" and insert -- Multimedia --, therefor.

Signed and Sealed this  
Tenth Day of September, 2013

Teresa Stanek Rea  
*Acting Director of the United States Patent and Trademark Office*

UNITED STATES PATENT AND TRADEMARK OFFICE
CERTIFICATE OF CORRECTION

Page 1 of 1

| | |
|---|---|
| PATENT NO. | : 8,452,529 B2 |
| APPLICATION NO. | : 11/972559 |
| DATED | : May 28, 2013 |
| INVENTOR(S) | : Alten |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1023 days.

Signed and Sealed this
Thirtieth Day of December, 2014

Michelle K. Lee
*Deputy Director of the United States Patent and Trademark Office*